United States Patent

Peters

[15] 3,678,463

[45] July 18, 1972

[54] CONTROLLED PAUSE IN DATA PROCESSING APPARTUS

[72] Inventor: Theodore Richmond Peters, Bernardsville, N.J.

[73] Assignee: Bell Telephone Laboratories Incorporated, Murray Hill, N.J.

[22] Filed: April 27, 1970

[21] Appl. No.: 32,083

[52] U.S. Cl. .......... 340/172.5

[51] Int. Cl. .......... G06f 9/18

[58] Field of Search .......... 340/172.5; 235/157

[56] References Cited

UNITED STATES PATENTS

| | | | |
|---|---|---|---|
| 3,312,951 | 4/1967 | Hertz | 340/172.5 |
| 3,333,252 | 7/1967 | Shimabukurd | 340/172.5 |
| 3,541,520 | 11/1970 | Mullery et al. | 340/172.5 |
| 3,408,629 | 10/1968 | Haselwood | 340/172.5 |
| 3,611,306 | 10/1971 | Reigal et al. | 340/172.5 |
| 3,611,311 | 10/1971 | Andrews | 340/172.5 |

*Primary Examiner*—Paul J. Henon
*Assistant Examiner*—Mark Edward Nusbaum
*Attorney*—R. J. Guenther and William L. Keefauver

[57] ABSTRACT

Apparatus for permitting a precise halt and restart in execution in one or more subunits in a data processing system which subunits are not necessarily amenable to an immediate halt. Means are provided to determine and store for each such subunit the respective time, $T_E$, elapsed from the occurrence of a request to halt until an actual halt is effected (usually at the end of a processing sequence). Upon restarting of the system generally, the particular subunits are delayed by an amount equal to the respective value of $T_E$.

10 Claims, 6 Drawing Figures

PAUSE

RESTART

INVENTOR
T. R. PETERS
BY William Ryan
ATTORNEY

CONTROLLED PAUSE IN DATA PROCESSING APPARTUS

GOVERNMENT CONTRACT

The invention herein claimed was made in the course of or under a contract with the Department of the Army.

This invention relates to data processing systems. More particularly, this invention relates to data processing systems having a source of clock signals for synchronously controlling at most some, but not all, component units. Still more particularly, the present invention relates to such systems wherein there is provided means to precisely halt and resume operation of all or a substantial portion of the components of the system.

BACKGROUND AND PRIOR ART

Many modern digital computers are said to be synchronous machines. That is, there is provided in such systems a clock or other source of timing which controls the sequence of operations performed by each component of the system. It is most common for the timing signals supplied by the clock to occur at equally spaced intervals known as clock intervals. Each fundamental operation performed within the data processing system typically requires a fixed or predictable number of clock intervals for its performance.

Other modern data processing systems are said to be asynchronous in that the fundamental operations are performed only when a previous operation (or previous operations) has been completed. Thus, these operations are performed without reference to a common (synchronizing) clock.

Still other data processing systems have attributes of both synchronous and asynchronous machines. Thus, it is quite common to include within a large (or sometimes not so large) data processing system components or subunits some of which are controlled (or slaved) to a master clock and other subunits which operate asynchronously. An important example of the class of partly synchronous-partly asynchronous systems is that of a computer system in which the response to a memory access request is delayed in accordance with existing operating conditions. For example, in a computer having priority scheduling as between a number of users (sources of memory access requests), a particular request will be delayed if a request of higher priority is made substantially concurrently. Numerous other partly asynchronous data processing systems include those having a bulk memory (such as a disk or drum) wherein the time for access to a given information element will vary depending on the location of the element relative to a readout device. Other asynchronous operations in computer systems include memory paging and data relocation in time sharing systems, modeling and simulation of stochastic events, and the conditional generation of timing information using analog delay lines and controlled transducers.

An important class of modern data processing apparatus is that which includes computers which operate in "real time." These computers are said to embody a unity of time and action. Such real time computer operation is typical in situations where there is a continuing supply of input data (usually data sequences) with a required continuous (or recurring) sequence of data outputs, and wherein each successive output corresponds to a current (or most recent) sequence of input data. Stated most simply, the input data are not permitted to accumulate without an attendant output being generated. Rather, the input data must be processed substantially immediately after their arrival. Perhaps the most widely used real time data processing facility is the interconnecting telephone plant.

It is often required in a data processing system to include elements having different operating speeds. Further, as mentioned above, some subunits in a comprehensive data processing system may operate asynchronously while other subunits operate synchronously. Many techniques have been developed to permit the interaction or interfacing of these various kinds of subunits. Principal among these is the well-known technique of buffering, illustrated generally in U. S. Reissue Pat. No. Re. 26,832 issued on Mar. 17, 1970 to P. C. Randler and U. S. Pat. No. 3,406,378 issued Oct. 15, 1968 to R. S. Bradford.

Many occasions arise in the course of processing substantial amounts of data at which it is desired to halt the operation of all, or some number less than all, of the subunits of a data processing system. Thus, for example, when in a real time operating environment a first subunit of the system, by virtue of its superior operating speed, tends to "outdistance" related processing in another subunit, it is desirable to cause the first of these subunits to temporarily halt or pause in its operations to allow the second subunit to "catch up." Similarly, it is often desirable in the course of processing data to permit a cessation of processing when a significant error has occurred. Further, it is desirable in such circumstances to permit the cessation to be accomplished in such manner as to permit a restarting without resorting to a complete duplication of processing accomplished up to the point where the error occurred or was detected. One such system in which this is desirable is that described in copending U. S. Pat. application by W. A. Artz, et al, Ser. No. 836,242, filed June 25, 1969.

Previous techniques for effecting a halt in data processing, in all but the simplest, all-synchronous systems have been directed to program techniques including periodic testing for the existence of specified conditions (flags, sense indicators, and the like). When these conditions are found to be present, programmed transfer or other specified action is then undertaken. This typically includes program-controlled testing for numerous conditions, the storing of large amounts of data and the consumption of a considerable amount of operating time. Additionally, because of the program-controlled nature of these halts or pauses, a considerable inefficiency of programming often results.

More importantly, however, such program-controlled interrupts are typically able to precisely control at most those processes and subunits slaved to the master clock under which the program operates. There is no known software-controlled technique of universal application which permits a precisely reproducible pause at an arbitrary (nonpreselected) point in the course of data processing. Thus, asynchronous processing underway at the time a halt or pause is required will ordinarily proceed apace without immediate regard to an interrupt signal. Such asynchronous processing will continue for a period of time which is usually not precisely determinable by the controlling program. Thus, when the processing that was halted is to be resumed, either (1) some error will be introduced by virtue of restarting without exact knowledge of the state of the asynchronous units at the time of interrupt, or (2) an inefficiency of processing will occur by reason of reverting processing back to a point in time, prior to the time of interrupt, at which precise information is available regarding the state of all subunits, including those operating asynchronously. It should be noted, however, that this latter alternative is not available in all cases. Further, where it is available, extensive, time consuming, computations and a considerable amount of dedicated storage are usually required.

It is an object of the present invention to overcome some or all of the above-mentioned deficiencies or inefficiencies.

It is therefore an object of the present invention that there be provided in a data processing system means for halting processing of all, or some portion less than all, of the subunits in the system.

It is another object of the present invention that there be provided means for precisely halting such subunits in such manner that they may be restarted at the point of interruption.

It is a further object of the present invention that there be provided means for so halting the processing in a system having both synchronous and asynchronous subunits.

It is a further object of the present invention to provide a pause in execution in a data processing system with a minimum of additional apparatus and with a minimum of required processing time devoted to effecting the pause.

It is a further object of the present invention to provide a pause in the execution of a first process in a data processing system including both synchronous and asynchronous subunits and to further utilize some or all of these subunits for execution of at least a second process during this pause.

SUMMARY OF THE INVENTION

Briefly stated, the present invention provides for a precise pause (PHP, or precise hardware pause) in the execution of processing operations in a data processing system by providing means for halting the master (or other control) clock to effect the suspension of operations of all subunits slaved to the master clock. The halting of processing in asynchronous subunits is conveniently effected by providing an interrupt pulse which inhibits further requests to the asynchronous subunits. Also provided is a source of periodic auxiliary clock pulses which is started by the interrupt signal and a plurality of counters for counting the number of these auxiliary pulses occurring during the interval from the occurrence of the interrupt signal until the output response by each asynchronous subunits is detected.

The above-mentioned and other aspects of the present invention will be more clearly understood after considering the detailed description below in connection with the drawing wherein.

DETAILED DESCRIPTION

A Typical Asynchronous Subunit

As indicated above, the kind of subunit that provides the greatest difficulty when a precise pause is desired in a data processing system is that which is asynchronous relative to a master clock or operations of other subunits of the system. A number of examples of such asynchronous subunits have been given above. An analysis of the fundamental nature of each of these asynchronous subunits reveals that, at bottom, many include means for generating at an uncertain future time an output in response to a current input request or stimulus. That is, underlying the asynchronous nature of such a subunit is the indefiniteness of the time of occurrence, relative to a fixed reference time, of the achieving of one or more internal states or output response. A further or alternate difficulty encountered in many asynchronous subunits is that once they commence the execution of an operation or task it is undesirable, difficult, or impossible to immediately halt this execution until the operation or task is complete. Further, many of the important output and state-identifying signals in such subunits are not amenable to access during the course of execution. These difficulties are of the essence of its asynchrony. In fact, it is one or more of these aspects common to substantially all asynchronous subunits, which provide the difficulty in precisely determining its state at the time of a desired pause.

Figure 1:
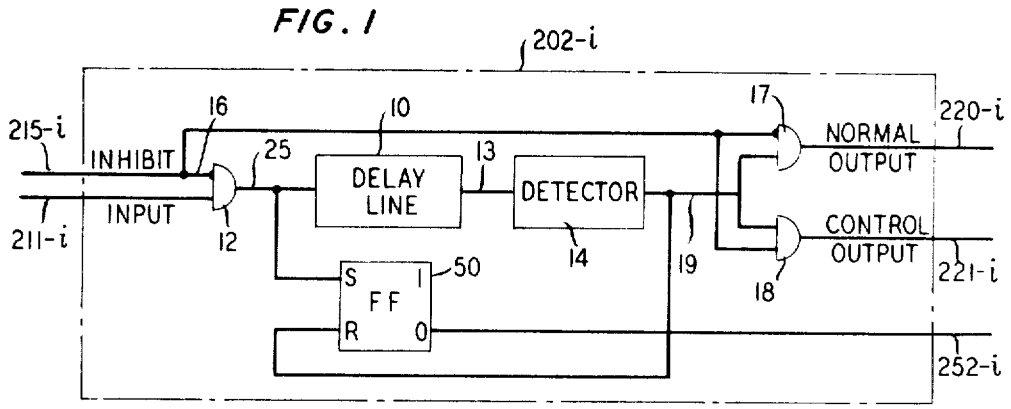
FIG. 1 shows a typical asynchronous subunit.

Because it embodies many of these common features of asynchronous subunits, and because it represents a quite typical example of an asynchronous subunit, the configuration shown in FIG. 1 will be treated as representative of the class of asynchronous units generally. Because it is, in general, one of several (or more) asynchronous subunits, it will be regarded as the *i*th such subunit and designated **202-*i***.

To the extent that a particular asynchronous subunit of interest to a user of the present invention differs from that shown in FIG. 1, modifications may be required to adapt the techniques described herein, However, any such modifications will follow directly from the functional specification of the particular asynchronous subunit and the detailed operation presented herein. That is, only straightforward modification is required.

Shown in FIG. 1 is a delay line 10 of standard design responsive to an input pulse on lead **211-*i* passing through AND gate 12. After a suitable delay, dependent on the characteristics of the delay line, the input pulse exits the delay line on lead 13 and is detected by detector 14. Detector 14 is conveniently matched to delay line 10 and typically regenerates the input pulse presented on lead 211-*i*** with respect to magnitude and duration.

Also shown in FIG. 1 is an inhibit lead **215-*i* connected to input AND gate 12. The inhibit lead is arranged to assume its 1 condition whenever it is desired to prevent an input pulse appearing at lead 221-*i* from being gated through AND gate 12 to delay line 10. This is readily accomplished by arranging AND gate 12 to include an inhibit input shown in FIG. 1 by the numeral 16. Inhibit lead 215-*i* is also connected to output AND gates 17 and 18; the connection to gate 17 being by way of an inhibit input while the connection to gate 18 by way of a conventional input. The remaining input to each of the gates 17 and 18 is provided by the output of detector 14 on lead 19**.

The result of the output gating arrangement is that whenever an inhibit signal (level), indicating a 1 condition on lead **215-*i*, is present, any pulse in delay line 10 will be detected and delivered to output leads 221-*i* identified as the "control" output lead. Whenever inhibit lead 215-*i* exhibits a 0 signal condition the "normal" output lead 220-*i*, delivers the delayed replica of the input pulse. It should be noted, of course, that the condition of inhibit lead 215-*i* may change while a pulse is progressing along delay line 10. In this case then, a pulse which would ordinarily pass from input lead 211-*i* to the normal output lead 220-*i* will pass instead to output lead 221-*i* by way of gate 18**.

Also shown in FIG. 1 is a flip-flop 50, of standard design, having its set (S) input connected to the output of gate 12, lead 25. Thus, flip-flop 50 is switched to its 1 condition whenever a pulse is entered into delay line 10. The reset (R) input to flip-flop 50 is connected to lead 19, the output of detector 14. Thus, when a pulse exits delay line 10, flip-flop 50 is returned to its 0 state. It is clear, then, that flip-flop 50 provides a 1 condition on its 0 output lead whenever delay line 10 contains no pulse. This output lead appears as lead **252-*i*. Suitable initializing of flip-flop 50 to the reset condition is conveniently provided before any pulses are supplied to delay line 10**.

Figure 4:
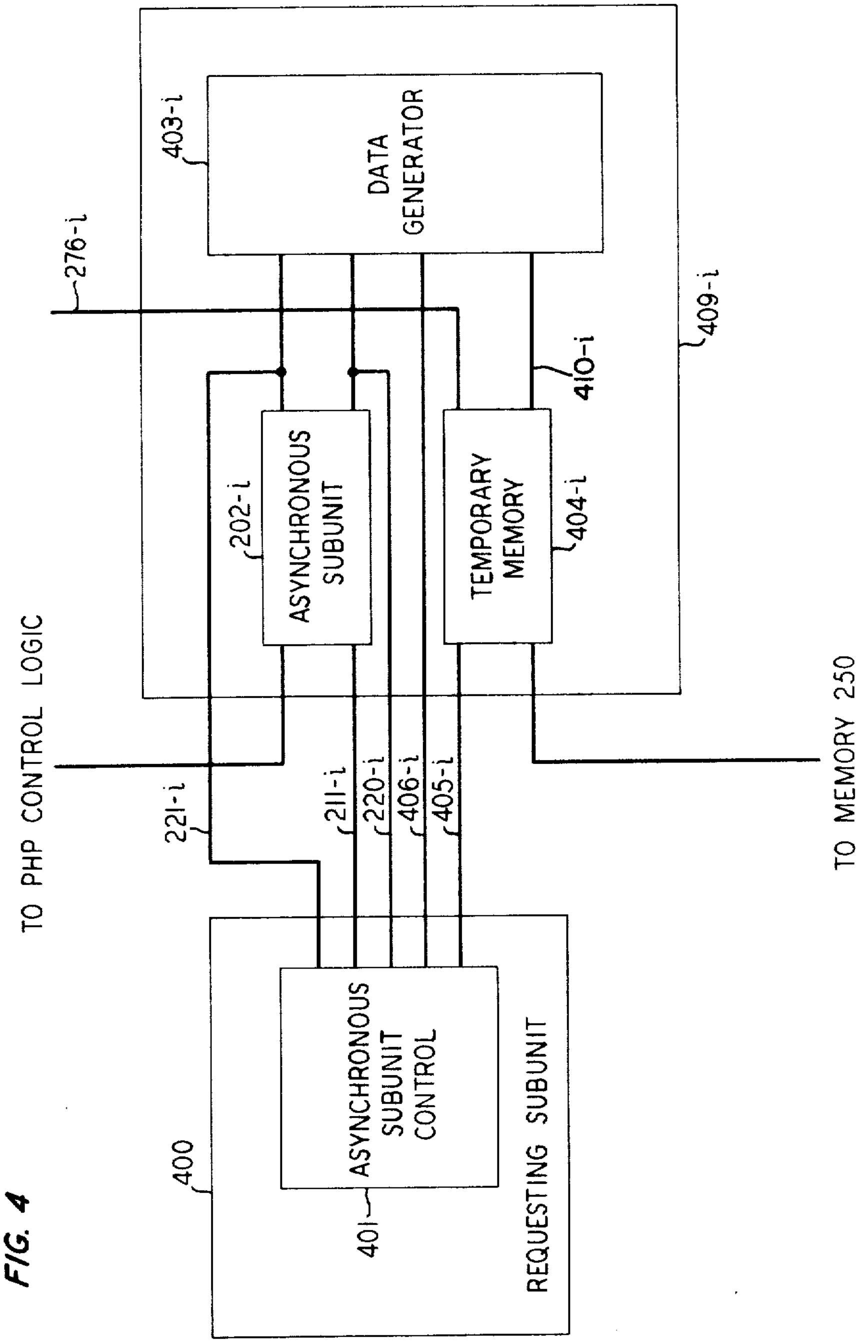
FIG. 4 illustrates modifications to the circuitry of FIG. 1.

An example of straightforward modifications to be made to the circuitry of FIG. 1 are those required when the actual asynchronous subunit involved includes a memory or other device which, as a result of its operation, generates output data. Such a configuration is shown in FIG. 4 and will be discussed below.

PRECISE HARDWARE PAUSE APPARATUS

Figure 2:
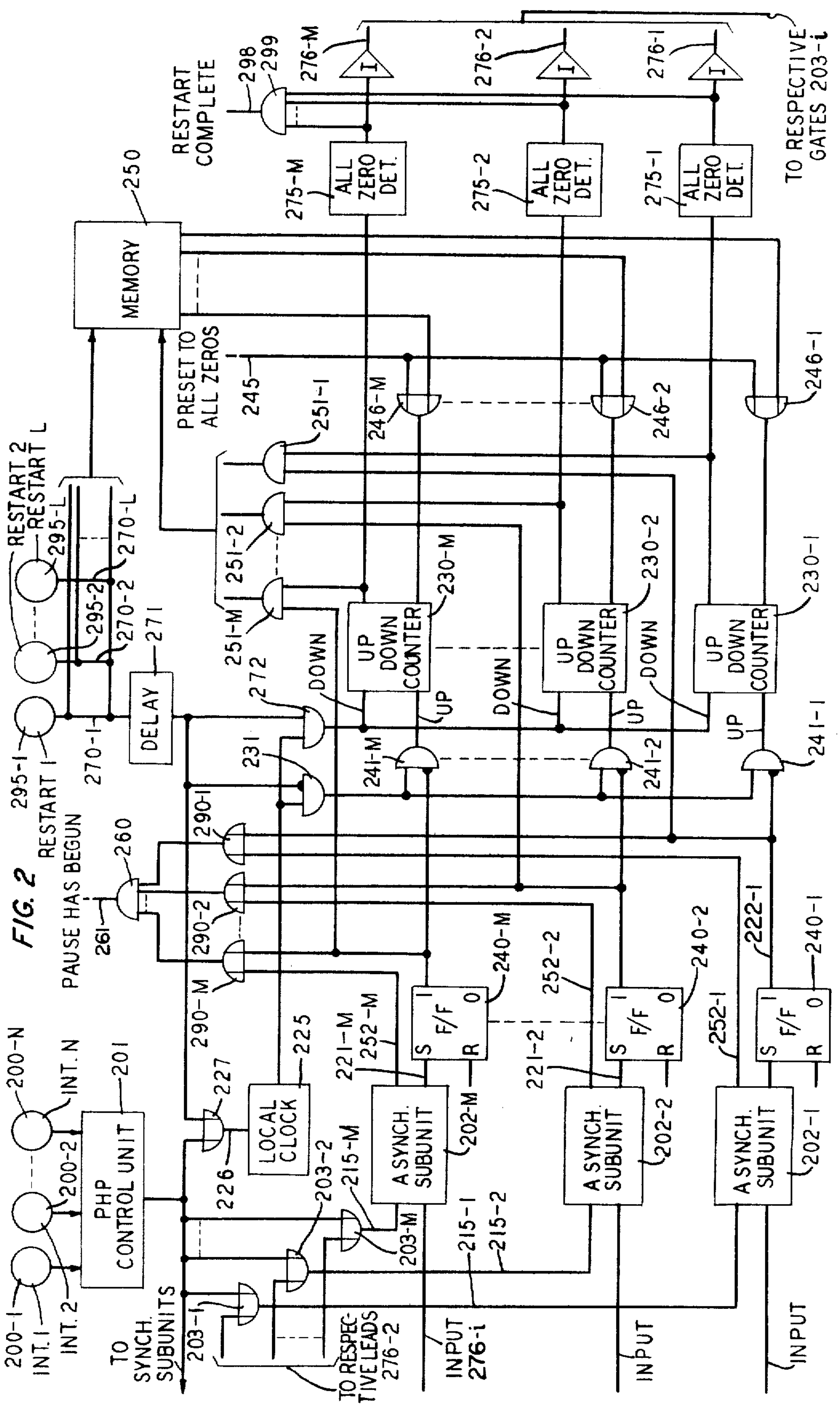
FIG. 2 shows circuitry provided in accordance with one embodiment of the present invention for initiating the precise pausing of the apparatus typified by that shown in FIG. 1, FIGS. 3A–C are timing charts illustrating typical operating sequences for the apparatus of FIG. 2.

FIG. 2 shows in block diagram form the general configuration of a system including apparatus for achieving the desired precise hardware pause (PHP). Shown in FIG. 2 is a plurality of sources of interrupt signals indicated as 200-1 through 200-N. Each of these, under independent control, is capable of supplying an interrupt signal to PHP control unit 201. PHP control unit 201 is in turn arranged to be responsive to any one of the sources of interrupt signals to generate the required control signals to initiate a precise hardware pause.

In the case where it is desired that the pause be initiated immediately upon the incidence of an interrupt pulse at PHP control unit 201, the latter unit may take the form of a standard flip-flop or other two-state device capable of driving the required loads. Where it is desired that other than an immediate pause occur, suitable delay may be introduced in a path from the respective interrupt sources to the output of PHP control unit 201.

The plurality of output leads from PHP control unit 201 is shown in FIG. 2 to be connected by way of OR gates 203-1 through 203-M to a corresponding plurality of asynchronous subunits 202-1 through 202-M. Each of these asynchronous subunits will assume a form dependent on its intended function, but will share all of the important characteristics of the asynchronous subunit shown in FIG. 1. To emphasize this relationship, the branches of the output lead from PHP control unit 201 after being ORed by gates 203-1 through 203-M are identified by the numerals 215-1 through 215-M to indicate the correspondence to the inhibit lead 215-*i* in FIG. 1. Likewise, the output of the asynchronous subunits 202-1 through 202-M are indicated by the numerals 221-1 through 221-M, corresponding to a plurality of control output leads such as lead 221-*i* in FIG. 1.

Also connected to the output of PHP control unit 201 is a local clock 225 which is set into action by a 1 indication on lead 226. The connection between the output of PHP control unit 201 is by way of OR gate 227. Thus, when the output of PHP control unit 201 assumes a 1 condition, the local clock 225 is started. Clock pulses from local clock 225 are selectively gated to up-down counters 230-1 through 230-M. There is a one-to-one correspondence between the asynchronous subunits 221-1 through 221-M and similarly numbered counters 230-1 through 230-M.

When a 1 condition exists on the leads 215-*i* (the inhibit leads as far as asynchronous subunits 202-1 through 202-M are concerned), any pulses tending to be applied at the input of the asynchronous subunits is effectively inhibited by a gate corresponding to gate 12 in FIG. 1 included in each of these subunits. Further, when a 1 condition exists on a lead 215-*i* in FIG. 2, any pulses currently propagating along a delay line in a given asynchronous subunit 202-*i*, will cause an output on the corresponding output lead 221-*i*. The time of arrival of this pulse will, of course, depend on the exact location of the pulse along the delay line at the time an interrupt pulse is delivered to PHP control unit 201 (the time at which the local clock 225 becomes operative).

The output of the asynchronous subunits on leads 221-1 through 221-M are connected to respective ones of flip-flops 240-1 through 240-M. This connection is arranged to be at the "set" input to these flip-flops, so that the arrival of an output pulse on a control output lead 221-*i* causes the corresponding flip-flop 240-*i* to assume the 1 condition. This 1 condition in turn inhibits the passage of clock signals from local clock 225 through AND gate 231 at the corresponding one of AND gates 241-1 through 241-M. Thus, the local clock having been turned on at the same time that the input to each of the asynchronous subunits 202-1 through 202-M was inhibited, the count of clock pulses in a given counter 230-*i* is indicative of the elapsed time between the occurrence of an interrupt pulse indicating that a pause is to be commenced and the occurrence of a signal indicating that the asynchronous operation of subunit 202-*i* has been completed. It is noted that for purposes of determining the interval just mentioned, the clock pulses are advantageously applied to the "up" input of the up-down counter 230-*i*. It is assumed that prior to the occurrence of a pause, each of the counters 230-1 through 230-M has been preset to all 0's by means of lead 245 and the plurality of OR gates 246-1 through 246-M. While a single gate is shown for the presetting operation, it should be understood that required number of leads to actually effect a presetting to 0 (or any other specified condition) is to be understood by the output of gates 246-1 through 246-M.

To facilitate the restarting of each of the asynchronous subunits 202-1 through 202-M at a subsequent time, the contents of each of the counters 230-1 through 230-M at the time that a pulse arrives at the output of each of the subunits is stored in a memory 250. This storage process is effected by gating these contents, by way of AND gates 251-1 through 251-M, when the corresponding ones of flip-flops 240-1 through 240-M assume their 1 condition. Once this storage has been effected, all of the information necessary to restart the corresponding asynchronous subunit is present.

When all of the information necessary to restart all of the asynchronous subunits has been stored in memory 250, the beginning of the precise hardware pause has been effected. At this time, each of the asynchronous subunits is totally inactive and may remain so until it is decided to restart them on their previous assigned functions or, as will be indicated in more detail below, on a new assignment. The existence of this condition is advantageously effected through the use of AND gate 260, which requires for a 1 condition to exist in its output 261 that a concurrent 1 condition exist at the output of all of the OR gates 290-1 through 290-M. OR gates 290-1 through 290-M are in turn placed in their 1 state by a 1 on the respective ones of flip-flops 240-1 through 240-M or by 1's on each of the leads 252-1 through 252-M. Alternately, when only some of the asynchronous subunits are active at the time an interrupt signal occurs, the 1 outputs of the corresponding ones of the flip-flops 240-*i* will provide some of the required 1 inputs to AND gate 260 while the remainder are supplied by the 252-*i* leads from the inactive subunits. The output on lead 261 may then be used to restore the various storage devices in the circuit of FIG. 2 (except memory 250) to their quiescent condition. That is, lead 261 may be used to reset the flip-flops 240-1 through 240-M to signal PHP control unit 201 that the pause has begun. This signalling in turn has the effect of removing the inhibiting effect of a 1 signal on the inputs of asynchronous subunits 202-1 through 202-M and to remove the turn-on signal to local clock 225. This signal on lead 261 may also be used to preset to zero each of counters 230-1 through 230-*m*.

It should be noted in connection with the apparatus in FIG. 2 that there is provided as an additional output from PHP control unit 201 an indication to the synchronous subunits of the overall system that a pause is to be initiated. This may be provided, for example, by using a 1 level on this output lead to inhibit the master clock controlling all of the synchronous portions of the system. Alternately, when special circumstances are present, this signal may be used to inhibit the appropriate portions of each of the synchronous subunits in the system.

To restart a system including asynchronous subunits 202-1 through 202-M in states indicated by previously stored information in memory 250, much of the above procedure need only be reversed. Thus, when a restart signal is applied at the output lead 270-*i* of a restart source 295-1 through 295-L (along with sufficient information to identify which stored information is to be retrieved from memory 250), the indicated contents of memory 250 are transferred back to respective counters 230-1 through 230-M by way of respective gates 246-1 through 246-M. After an appropriate delay to allow the counters to achieve their appropriate states (introduced by delay unit 271) local clock 225 is again turned on by the delayed 1 signal applied at lead 270-*i*. This signal also has the effect of inhibiting clock pulses from proceeding to the up terminal of counters 230-1 through 230-M because of the inhibit input on AND gate 231. On the other hand, such a 1 indication on lead 270-*i* causes clock pulses from local clock 225 to be gated by way of AND gate 272 to the "down" terminal of each of the counters 230-1 through 230-M. The effect, then, is to cause each of these counters to count down in response to applied clock signals from their preset condition towards 0.

Because, in general, the states indicated by the preset conditions are not the same for each associated asynchronous subunit 202-1 through 202-M, the corresponding counters 230-1 through 230-M will not achieve the all-zero state simultaneously. Accordingly, there is provided for each counter 230-*i* a corresponding "all-zero detector," 275-*i*. These detectors are standard translational and pulse circuits arranged to gate an output signal on lead 276-*i* when the corresponding counter 230-*i* achieves the all-zero state. In its simplest and preferred form detector 275-*i* assumes the configuration of an AND gate with one input connected to each stage of counter 230-*i*. Alternately this output signal on lead 276-*i* is conveniently arranged to be of substantially the same form as the output on corresponding output on lead 220-*i* of the respective asynchronous subset. In any event, the output on lead 275*i* is used to remove the inhibiting signal on the input to the asynchronous subunit 202-*i*. This is conveniently effected by placing inverters in each path from output lead 276-*i* to the respective input of gate 203-*i*.

It is seen, then, that counter 230-*i* under the control of presetting information from memory 250 and repetitive countdown signals from local clock 225 cooperates with detector 275-*i* to effectively duplicate (simulate) the function of corresponding asynchronous subunit 202*i* from the time that an interrupt signal arrives at PHP control unit 201 until the time that an in-progress asynchronous operation in that subunit is complete. AND gate 299 is conveniently arranged to provide a 1 signal on lead 298 when a restart sequence is complete.

The particular information used to preset the counters 230-1 through 230-M may be that corresponding to any prior pause. It is, of course, required that information supplied to the counters 230-1 through 230-M for subsequent countdown correspond to the same previous pause. An exception to this requirement, however, is that in which the involved subunits do not interact with each other or with the same one of other synchronous subunits. This feature is in no way fundamental to the basic operating procedure outlined above, but merely enhances the numerous and varied options available to a user.

TYPICAL OPERATING SEQUENCES

Figure 3A:
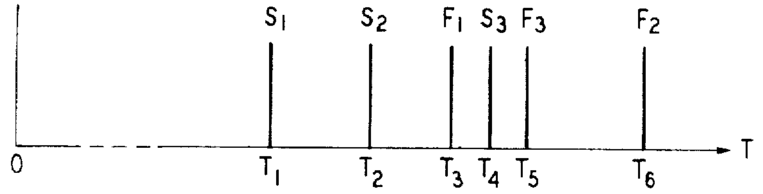
Figure 3B:
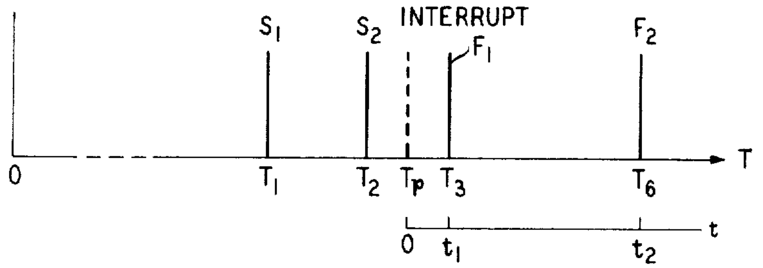
Figure 3C:
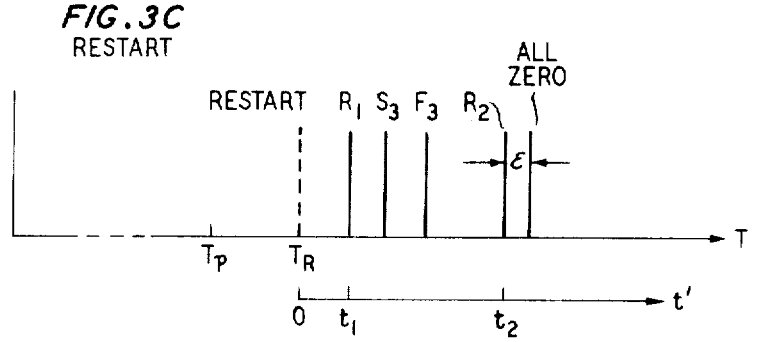

FIGS. 3A–C summarize operating sequences in a typical embodiment of the present invention. It is assumed that there are three operative asynchronous subunits to be considered.

In FIG. 3A, the operating sequence involved in a no-pause operation is illustrated. Thus at time $T_1$ (the T scale representing real time) asynchronous subunit 1 starts (hence $S_1$) an asynchronous period of operation which is assumed to continue on a particular occasion until time $T_3$. The "$F_1$" notation is intended to indicate the finish of the period of operation for asynchronous subunit 1.

Similarly, subunit 2 starts a period of operation at time $T_2$ and finishes at time $T_6$, as indicated in FIG. 3A by $S_2$ and $F_2$, respectively. Asynchronous subunit 3 starts its operation at $T_4$ and finishes at $T_5$.

When a pause is to be commenced, these same asynchronous subunits, under assumedly identical environmental conditions, operate as shown in FIG. 3B. Thus the periods of time for performing their respective functions would be identical to that shown in FIG. 3A except for the interrupt request occurring at time $T_p$. As in the no-pause case, subunits 1 and 2 start their operation at times $T_1$ and $T_2$ respectively. It is convenient to measure the time of occurrence of signals indicating completion of subunit operation from the time of occurrence of the interrupt request. Thus a new coordinate $t$, with $T_p$ (the time of occurrence of the interrupt request) as the origin is defined in FIG. 3B.

Because the interrupt request occurs prior to $T_3$, the operations of subunits 1 and 2 are not then finished, and subunit 3 has not started its operation. Because the remainder of the system (the synchronous portion) is stopped substantially immediately after $T_p$ (and is therefore not prepared to coact with it), subunit 3 is not permitted to start its asynchronous operation. Subunits 1 and 2, however, may not be "frozen" at $T_p$, but must continue until their operations are finished.

Since subunit 1 is assumed on this particular occasion to require $(T_3 - T_1)$ units of time for its operation and $(T_p - T_1)$ units has expired at the time the interrupt occurred, the time $t_1$ where $t_1 = (T_3 - T_1) - (T_p - T_1) = T_3 - T_p$, is the time indicated by the count in up-down counter 230-1 in FIG. 2 at the time that flip-flop 240-1 is set.

Similarly, up-down counter 230-2 will indicate a time $t_2 = T_6 - T_p$ at the time flip-flop 240-2 is set. Since no other asynchronous subunits are assumed operative, the required 1 conditions will be impressed on the inputs to AND gate 260 by way of the 1 outputs of flip-flops 240-1 and 2 and by way of leads 252-3 through 252-M. When these inputs appear at the input to AND gate 260 at $T = T_6$ or $t = t_2$, a 1 indication appears on lead 261, indicating that the pausing of all asynchronous subunits is complete.

FIG. 3C depicts the sequence of events occurring upon the restarting of the asynchronous subunits which were paused in the manner shown in FIG. 3B. Thus, assuming a restart signal occurs at $T_R$, there is loaded into counters 230-1 and 230-2, an indication of the state of asynchronous subunits 1 and 2 at the time the interrupt signal occurred. It will be further assumed that the particular pause to be concluded is that started by the sequence of events shown in FIG. 3B.

As shown in FIG. 3C, a restart signal is assumed to be presented at $T = T_R$. $T_R$ need have no necessary relation to $T_p$ in FIG. 3B also shown for convenience in FIG. 3C. Thus the interval between $T_p$ and $T_R$ may be short or long; the same as, or different from, previous similar pauses; and may include none, one, or more than one pause including any number of asynchronous subunits.

Since the period of time that elapsed between the occurrence of the interrupt pulse that initiated the pause now being terminated ($T_p$) and the completion of the asynchronous operations in-progress at $T_p$ is conveniently measured in values of t, it is useful to define $t' = T - T_R$ as shown in FIG. 3C. Since asynchronous unit 1 completed its operation at $t = t_1$, a count corresponding to this value is loaded into counter 230-1. Similarly, the count corresponding to $t = t_2$ is loaded into counter 230-2.

Countdown then commences (after the loading delay, if any), corresponding to increasing values of $t'$. When $t' = t_1$, counter 230-1 has reached the all-zero state. This is suitably indicated on lead 276-1 in FIG. 2. Asynchronous subunit 202-1 is then ready to go back on-line, i.e., the inhibit signal on lead 215-1 is removed by virtue of the absence of all 1 inputs on OR gate 203-1.

Correspondingly, when counter 230-2 is counted down to zero (at $t' = t_2$) lead 276-2 assumes the 1 condition, the inhibit signal on lead 215-2 is removed and asynchronous subunit 202-2 is ready to go back on-line. These on-line times for subunits 1 and 2 are indicated by $R_1$ and $R_2$ respectively in FIG. 3B.

It should be understood that the synchronous portions of the system, and the asynchronous subunits not having an operation in progress at the time $T_p$, are restarted at $T_R$. Thus the operation of asynchronous subunit 3, for example, is begun before subunits 1 and 2 go back on-line at $t' = t_1$ and $t_2$, respectively. Immediately after $t' = t_2$ (shown as an $\epsilon$ delay in FIG. 3C) however, the "restart complete" signal appears on lead 298 in FIG. 2. This indicates that the effect of the pause on the affected subunits has been completely neutralized, i.e., except for a delay in real time, the pausing operations are transparent in the overall processing sequence. For comparison, it should be noted that $S_3$ and $F_3$ occurred before $F_2$ in FIG. 3A, just as $S_3$ and $F_3$ occur before $R_2$ in FIG. 3C.

While FIGS. 3A–C indicate the time of occurrence of signals specifying the start and finish of certain operations, it should be borne in mind that the synchronous or other control portions of the system must retain an indication of the operation to be performed. For example, when the asynchronous operation to be performed is a memory access in a priority-access environment, the memory location to be accessed must be retained at the synchronous control unit (CPU or other). When the PHP is initiated, this information along with the contents of all other information and control registers, flip-flops and memory locations is stored, advantageously in a memory such as memory 250 in FIG. 2. When restart is begun at $T = T_R$ in FIG. 3C, this stored synchronous state information is restored to the registers, flip-flops and memory locations whence it came. Thus the information specifying a pending request for a memory access appears as before in the appropriate synchronous control register, etc., awaiting only a response from the memory unit. This access will be complete at the time the all-zero indication occurs for the memory access asynchronous subunit. At this time new memory access requests may be specified.

INFORMATION TO BE STORED

It is clear that in any large scale system including predominately synchronous subunits that the information required for a precise pause of the synchronous subunits is primarily the contents of the operative registers, flip-flops and memory elements. Thus, it is convenient upon stopping a primary process to merely effect a transfer of these contents to a main (or convenient auxiliary)memory. This being accomplished, the synchronous subunits can be said to have begun their pause.

Regarding any asynchronous subunits, however, it is clear that not all of the information involved in processing in an asynchronous subunit is required. Thus, for example, since processing will continue beyond the instant at which an interrupt signal occurs, there will in general be generated during this continuing period a number of intermediate states and corresponding signals representative of these states which are not required. In fact, all that is required is an indication of the state of each asynchronous subunit at the time the interrupt occurred and the time at which the processing underway by the asynchronous subunit at the time the interrupt occurred is completed. The apparatus shown in FIG. 2 is uniquely adapted for performing this latter indication. Further, since in most data processing systems ultimate control is supplied by a stored program under the control of a synchronous master clock, and since the asynchronous subunits are usually arranged to provide responses to synchronously controlled subunits, the current state of each asynchronous subunit is monitored by one or more synchronous subunits. Since, upon restarting, all of the information available to the synchronous subunits at the time a pause is begun is again made available to them (including information regarding a response expected from an asynchronous subunit), all that need be supplied in restarting a system having experienced a pause is information relating to the time of occurrence of the response.

There are many occasions when a number of fundamental subunits of a system may be regarded as a higher order subunit. This is equally true of synchronous and asynchronous subunits. Such a combination of subunits may be useful in the application of the present invention. Thus when two or more subunits, or readily-identified portions of subunits, cooperate in a fixed manner (though with variable operation times), it is often possible to only record and duplicate the timing of the combination during a pause and restart. Thus, for example, when the mechanical access apparatus associated with a disk memory unit (asynchronous) is considered to be combined with an electronic asynchronous priority access arrangement, only the total elapsed time from interrupt signal to completion of access for the priority circuit and the mechanical accessing need be noted and stored. That is, the combined priority and accessing apparatus may be treated as one asynchronous subunit.

In general, it can be said that timing information such as is determined and stored by the circuitry of FIG. 2 need only be so determined and stored for those asynchronous subunits (or combinations or subcombinations, thereof) as, independently of other such subunits, interface with another subunit (synchronous or asynchronous).

FIG. 4 illustrates additions to the circuitry of FIG. 1 corresponding to the case of an asynchronous subunit which includes a data generating facility. That is, the asynchronous subunit 409-*i* not only produces a timing function as does the subunit 202-*i* in FIG. 1, but it also generates one or more items of data which are generated by data generator 403-*i* and are required to be delivered to a (usually synchronous) requesting circuit 400. Typical of such a configuration is an asynchronous memory accessing circuit.

Thus, control circuit 400 may be a CPU or other processor requiring additional data to process. This request is formalized in a command including an input on lead 211-*i* and additional (address or other) data on lead 406-*i*. When no pause is involved the requested data are generated by data generator (memory) 403-*i* after the delay introduced by subunit 202-*i* in response to the (normal) output signal on lead 220-*i*. The requested data are then conveniently delivered on lead 406-*i*.

When a pause has been requested, however, no output appears on lead 220-*i*; instead, the output appears on lead 221-*i*. This signal conveniently gates the data generated in data generator 403-*i* to lead 410-*i*. Lead 410-*i* causes the data generated to be stored in temporary memory 404-*i* instead of being returned to requesting circuit 400. This is required because in general requesting circuit 400 will have been stopped prior to subunit 202-*i*. The data stored in memory 404-*i* is conveniently transferred to memory 250 in FIG. 1 along with the count on the corresponding up-down counter and appropriate identification data.

When restarting is desired, the contents of temporary memory 404-*i* are restored along with the contents of the corresponding up-down counter. When the synchronous units are restarted (at $T_R$ in the notation of FIG. 3C) and the local clock causes count down to commence, no immediate action is taken by asynchronous subunit 409-*i*. When the count reaches zero, however, and an appropriate signal appears on lead 276-*i*, the contents of temporary memory 404-*i* are delivered to the requesting circuit 400 along with the signal on lead 221-*i*.

Thus, except for the pause in real time, the requesting circuit 400 received the data requested exactly as it would had there been no pause. In particular, the relative timing of other operations in circuit 400 (and the rest of the system) to the arrival of the requested system are as they would have been without the pause. This result is present, of course, where data generator 403-*i* includes arithmetic or facilities other than a memory.

EXTENSIONS AND GENERALIZATIONS

It is well at this point to consider variations, extensions and generalizations of the above described techniques.

While PHP control unit 201 was said above to be amenable to implementation in the form of a flip-flop, it should be understood that with appropriate logic it is possible to modify by delaying or otherwise the requests originated by the sources of interrupt signals 200-1 through 200-N. In particular, provision may be made to steer one or more of these requests to make them conditional upon the existence of other conditions. These provisions may be useful, for example, when an interrupt signal is generated when a potential over load condition is indicated. It may be desirable to inhibit or delay this potential overload condition interrupt during certain critical phases of a computation or in anticipation of a decrease on the load from the originating source.

Although the typical asynchronous subunit illustrated in FIG. 1 is said to provide for the delay of "a pulse," it should be understood that in appropriate cases a sequence of coded pulses may form the output of the delay line 10,in such cases each pulse may be detected by detector 14 and delivered over output leads 220-*i* or 221-*i* as appropriate. Provision may then be made for determining which pulse in the sequence shall specify the "time of occurrence" of the output of the asynchronous subunit relative to the time of occurrence of an interrupt signal. For example, when the output of the asynchronous subunit corresponds to the response of a memory to a memory request, the first signal so delivered is advantageously chosen as the time of occurrence of the output of an asynchronous subunit 221-*i* for purposes of setting corresponding flip-flop 240-*i*.

While no details of memory 250 are given above, it should be understood that it may assume any standard memory form compatible with the other logic elements of the system. Thus, for example, it may include an array of magnetic cores or semiconductor elements or the like. Similarly, memory 250 may be arranged to be a word organized memory or may include a serial memory comprising a delay line or shift register. Similarly, the various logic gates, flip-flops and delay units shown may assume any standard form but where advantageously realized in semiconductor (transistor or integrated circuit) configurations.

No special significance should be attached to the quantities L, M, and N; they are meant to merely be representative values typical in a wide variety of applications. The specific logical configurations shown are merely representative of the concepts and practices herein described and are by no means exclusive.

The term "subunit" as used herein is not intended to indicate a necessarily small or hierarchically inferior entity. Rather, "subunit" is intended to convey merely an entity susceptible of separate identification.

Numerous and varied modifications to the hereindescribed embodiments within the spirit and scope of the present invention will occur to those skilled in the art.

The above-described techniques and apparatus are, of course, equally applicable to precisely pausing a synchronous subunit which, for one reason or another, is desirably not immediately stopped upon receipt of an interrupt signal.

What is claimed is:

1. A data processing system comprising

N asynchronous subunits, $N \geq 1$, for performing asynchronous processing operations in response to applied input signals, said asynchronous operations being of such a nature as to preclude a predetermination of the time of completion of said asynchronous operations, each of said subunits including means for indicating the completion of processing by the respective subunit, means for receiving a request to halt a first subset of said subunits, said first subset including at least one of said subunits, and means responsive to said indication of the completion of processing by each subunit in said subset for measuring the elapsed time from the occurrence of said request to halt until the completion of processing by each of said first subset of subunits underway at the time of occurrence of said request to halt.

2. Apparatus according to claim 1 wherein said means for measuring comprises a source of periodic clock signals having period P responsive to said request to halt, and a counter associated with each subunit in said subset for counting the number of said clock signals occurring in the interval from the occurrence of said request until said completion of processing by the respective one of said subunits.

3. Apparatus according to claim 2 further comprising means for storing information relating to the count of each of said counters.

4. Apparatus according to claim 1 further comprising means responsive to said request to halt for inhibiting input signals to said first subset of said subunits.

5. Apparatus according to claim 3 further comprising means for storing results of processing by each of said subunits which are generated after the occurrence of said request to halt.

6. Apparatus according to claim 3 further comprising means for generating completion signals indicating that all of said subset of said subunits have completed processing in progress at the time of said request to halt, and means responsive to said completion signals for restarting processing by said subset of said subunits.

7. Apparatus according to claim 6 wherein said means for restarting comprises means for entering data indicating the time of occurrence, relative to a request for halt, of the completion of processing in progress at the time said request to halt occurred into respective ones of said counters, means for periodically decrementing the contents of each of said counters by applying pulse signals with period P, and means for generating an all-zero signal for each subunit of said subset upon detecting a count of zero in the respective counter.

8. In a data processing system, apparatus for synchronizing the restart of a plurality of asynchronous subunits of said system, which asynchronous subunits are adapted for performing asynchronous operations, the completion of which operations may not be determined a priori, which subunits have been paused in response to a pause request, said synchronized restart being signaled by a restart signal, comprising:

means for storing for each of said plurality of subunits information indicative of the elapsed time, $T_E$, from the time of occurrence of said pause request until the completion of processing in progress at said time of occurrence at the respective ones of said paused subunits, and means responsive to respective stored information for delaying, relative to said restart signal, the enabling for normal operation of each of said paused subunits for a period equal to the respective value of $T_E$.

9. Apparatus according to claim 8 further comprising means for storing the results of processing generated during said elapsed time, and means for generating an output corresponding to said stored results after said period equal to $T_E$.

10. Apparatus according to claim 8 further comprising means for inhibiting input signals to said paused subunits until said paused subunit is restarted.

* * * * *

UNITED STATES PATENT OFFICE

CERTIFICATE OF CORRECTION

Patent No. 3,678,463 Dated July 18, 1972

Inventor(s) Theodore Richmond Peters

It is certified that error appears in the above-identified patent and that said Letters Patent are hereby corrected as shown below:

In the title, change "APPARTUS" to --APPARATUS--.

Column 1, line 2, change "APPARTUS" to --APPARATUS--.

Column 4, line 12, change "221" to --211--.

Signed and sealed this 27th day of February 1973.

(SEAL)
Attest:

EDWARD M.FLETCHER,JR.
Attesting Officer

ROBERT GOTTSCHALK
Commissioner of Patents